United States Patent
Miyawaki et al.

(10) Patent No.: US 7,566,377 B2
(45) Date of Patent: Jul. 28, 2009

(54) LIQUID CRYSTAL SEALING AGENT COMPOSITION AND MANUFACTURING METHOD OF LIQUID CRYSTAL DISPLAY PANEL USING THE SAME

(75) Inventors: Takahisa Miyawaki, Sodegaura (JP); Yasushi Mizuta, Sodegaura (JP); Fumito Takeuchi, Sodegaura (JP); Kenji Itou, Sodegaura (JP); Tadashi Kitamura, Sodegaura (JP); Hiroyuki Asakura, Sodegaura (JP); Kenichi Yashiro, Sodegaura (JP); Kei Nagata, Sodegaura (JP)

(73) Assignees: Mitsui Chemicals, Inc., Minato-Ku, Tokyo (JP); Sharp Kabushiki Kaisha, Osaka-Shi, Osaka (JP)

( * ) Notice: Subject to any disclaimer, the term of this patent is extended or adjusted under 35 U.S.C. 154(b) by 417 days.

(21) Appl. No.: 10/528,196

(22) PCT Filed: Sep. 19, 2003

(86) PCT No.: PCT/JP03/11973

§ 371 (c)(1), (2), (4) Date: Mar. 17, 2005

(87) PCT Pub. No.: WO2004/027502

PCT Pub. Date: Apr. 1, 2004

(65) Prior Publication Data

US 2006/0009579 A1    Jan. 12, 2006

(30) Foreign Application Priority Data

Sep. 19, 2002 (JP) ............... 2002-273452

(51) Int. Cl.
*B32B 38/04* (2006.01)
*C08L 63/00* (2006.01)
(52) U.S. Cl. ............. 156/272.2; 525/107; 525/108
(58) Field of Classification Search ........ 525/107, 525/108; 156/272.2
See application file for complete search history.

(56) References Cited

U.S. PATENT DOCUMENTS

| 4,778,851 A * | 10/1988 | Henton et al. ........... 525/65 |
| 5,898,041 A | 4/1999 | Yamada et al. |
| 6,111,015 A * | 8/2000 | Eldin et al. ........... 525/65 |
| 2003/0147034 A1 | 8/2003 | Kojima |
| 2007/0122742 A1* | 5/2007 | Kato et al. ........... 430/270.1 |

FOREIGN PATENT DOCUMENTS

| EP | 730188 A | 9/1996 | |
| JP | 63-179323 | * 7/1988 | ........... 525/107 |
| JP | 5-156230 | 6/1993 | |
| JP | 5-295087 A | 11/1993 | |
| JP | 09-005759 A | 1/1997 | |
| JP | 2000-347203 | 12/2000 | |
| JP | 2001-83531 A | 3/2001 | |
| JP | 2001-100224 | 4/2001 | |
| JP | 2001-133794 A | 5/2001 | |
| JP | 2002-88228 A | 3/2002 | |

OTHER PUBLICATIONS

Kunihiro et al., machine translation of JP-05295087, 1993, Detailed Description of the Invention, pp. 1-8.*
Nobumasa et al., 1988, Patent Abstracts of Japan. p. 1.*

* cited by examiner

*Primary Examiner*—Philip C Tucker
*Assistant Examiner*—Michael N Orlando
(74) *Attorney, Agent, or Firm*—Buchanan Ingersoll & Rooney PC

(57) ABSTRACT

A liquid crystal sealing agent composition that is a one-component light and heat-curable resin composition containing: (1) a solid epoxy resin having a ring and ball method softening temperature of 40° C. or above; (2) an acrylate monomer and/or a methacrylate monomer, or an oligomer thereof; (3) a thermoplastic polymer having a ring and ball method softening temperature of 50 to 120° C., the thermoplastic polymer being obtained by copolymerizing an acrylate monomer and/or a methacrylate monomer with a monomer copolymerizable therewith; (4) a light-activated radical polymerization initiator; and (5) a latent epoxy curing agent. The light and heat curable liquid crystal sealing agent composition is employable in one drop fill, is excellent in properties of a cured product particularly after first-stage light curing, achieves stable cell gap after cell gap formation, permits prevention of contamination of the liquid crystal in second-stage heat curing, is excellent in curing properties in shaded area, and shows superior bonding reliability.

26 Claims, No Drawings

LIQUID CRYSTAL SEALING AGENT COMPOSITION AND MANUFACTURING METHOD OF LIQUID CRYSTAL DISPLAY PANEL USING THE SAME

FIELD OF THE INVENTION

The present invention relates to a liquid crystal sealing agent composition. More particularly, the invention relates to a liquid crystal sealing agent composition for one drop fill process, a method of manufacturing a liquid crystal display panel using the composition, and a liquid crystal display panel.

BACKGROUND OF THE INVENTION

In recent years, liquid crystal display (LCD) panels having characteristics of lightweight and high definition have been widely used in various equipment including cellular phones. The LCD panels are traditionally manufactured as follows. A heat-curable sealing agent composition based on an epoxy resin is applied to an LCD glass substrate, followed by pre-curing. Subsequently, a counter substrate is superposed thereon and bonded together by heating and pressing, so that an LC sealing cell is fabricated. A liquid crystal is then injected in vacuum and thereafter the LC inlet is sealed.

The above LCD panel manufacturing process, however, tends to result in cell gap variations attributed to thermal stress by heat curing. Further, the LC injection is a time-consuming step. Accordingly, it has been difficult to reduce the manufacturing process time and to improve productivity of high-definition small and large LCD panels.

To solve these problems use of such LC sealing agents have been proposed as light-curable acrylic LC sealing agents based on acrylate or methacrylate, light-curable epoxy LC sealing agents, and light and heat-curable LC sealing agents based on partially acrylated or partially methacrylated bisphenol epoxy resins.

Of these sealing agents, the light and heat-curable LC sealing agents are proposed for use in processes of manufacturing LCD panels, specifically as follows. The sealing agent is applied in vacuum on a substrate on which an electrode pattern and an alignment layer have been provided. Subsequently, a liquid crystal is dropped on the sealing agent-coated substrate or a counter substrate, and the substrates are laminated together. Thereafter, first-stage light curing is performed by UV irradiation or the like to quickly fix the substrates, namely, to form a cell gap. Further, second-stage heat curing is carried out without use of a pressing jig to cure completely the sealing agent. For example, such process is disclosed as one drop fill in JP-A-H09-5759.

Gap formation by light curing is one of the characteristics required for the LC sealing agent compositions used in the one drop fill. When the first-stage light curing results in inadequate gap formation, the opposed substrates may be misaligned or the heat-curing component (for example, epoxy resin) that has not been cured may exude in the subsequent second-stage heat curing step, leading to contamination of liquid crystal. Particularly, the latter has been perceived as a problem in view of critical influence on LCD panel performance. Moreover, improvement has been desired for curing properties in area shaded by the wiring.

JP-A-2001-133794 discloses an LC sealing agent composition for one drop fill that contains a light-curable component, a heat-curable component and a light curing agent, and that achieves specified decrease in LC specific resistance and specified change in LC phase transition point. However, there is no disclosure that describes the composition's gap formation properties by light curing and curing properties in area shaded by the wiring. Thus, reliability of the LCD panels obtained is not always satisfactory.

Moreover, the LC sealing agent compositions are required for other properties, such as bonding reliability in long-term exposure to high temperature and high humidity, retention of LC electro-optic properties, and no influence on the LC alignment.

It is therefore an object of the present invention to provide a liquid crystal sealing agent composition that is favorably employable in the one drop fill, is excellent in curing properties in the first-stage light curing to give a satisfactory cured product, and has superior curing properties in area shaded by the wiring. Specifically, the object is to provide a one-component light and heat-curable liquid crystal sealing agent composition that is excellent in cell gap stability exhibited after formation of a cell gap by light curing, permits prevention of contamination of the liquid crystal in the second-stage heat curing, and has superior bonding reliability. It is another object of the invention to provide a method for manufacturing a liquid crystal display panel by the one drop fill using the liquid crystal sealing agent composition, and a liquid crystal display panel.

DISCLOSURE OF THE INVENTION

The present inventors earnestly studied to solve the aforementioned problems. As a result, it has been found that a one-component light and heat-curable resin composition as described below can solve the problems, thereby completing the invention.

That is, a liquid crystal sealing agent composition according to the present invention is a one-component light and heat-curable resin composition comprising:

(1) a solid epoxy resin having a softening temperature by the ring and ball method of 40° C. or above;

(2) an acrylate monomer and/or a methacrylate monomer, or an oligomer thereof;

(3) a thermoplastic polymer having, a softening temperature by the ring and ball method of 50 to 120° C., the thermoplastic polymer being obtained by copolymerizing an acrylate monomer and/or a methacrylate monomer with a monomer copolymerizable therewith;

(4) a light-activated radical polymerization initiator; and (5) a latent epoxy curing agent.

As used herein, the softening temperature is determined by the ring and ball method in accordance with JIS K2207.

Preferably, the composition further contains (6) a partially esterified epoxy resin obtained by reacting an epoxy resin with a compound having at least one methacryloyl or acryloyl group and at least one carboxyl group in the molecule.

In the invention, the solid epoxy resin (1) preferably ranges in number-average molecular weight from 500 to 2000.

Further, the solid epoxy resin (1) is preferably contained in an amount of 5 to 40 parts by weight in 100 parts by weight of the liquid crystal sealing agent composition.

In the invention, the acrylate monomer and/or the methacrylate monomer, or the oligomer thereof (2) preferably ranges in number-average molecular weight from 250 to 2000 and has a Fedors theoretical solubility parameter (sp value) in the range of 10.0 to 13.0 $(cal/cm^3)^{1/2}$.

In the liquid crystal sealing agent composition, the solid epoxy resin (1) is preferably contained in an amount of 20 to less than 200 parts by weight per 100 parts by weight of the acrylate monomer and/or the methacrylate monomer, or the oligomer thereof (2).

The thermoplastic polymer (3) preferably has an average particle diameter in the range of 0.05 to 5 µm. As used herein, the average particle diameter means a mode diameter determined from mass-basis particle size distribution by the Coulter counter method.

The thermoplastic polymer (3) preferably comprises substantially spherical particles having a core-shell structure, and a core layer of the core-shell structure preferably comprises an elastomer obtained by copolymerizing an acrylate monomer and/or a methacrylate monomer with a monomer copolymerizable therewith.

Further, the thermoplastic polymer (3) is preferably contained in an amount of 2 to 40 parts by weight in 100 parts by weight of the liquid crystal sealing agent composition.

In the invention, the latent epoxy curing agent (5) is preferably an amine-based latent curing agent and preferably has a melting point or a ring and ball method softening temperature of 100° C. or above.

In the liquid crystal sealing agent composition, the solid epoxy resin (1) and the acrylate monomer and/or the methacrylate monomer, or the oligomer thereof (2) are preferably contained in a total amount of 160 to 800 parts by weight per 100 parts by weight of the partially esterified epoxy resin (6).

The liquid crystal sealing agent composition of the present invention preferably has:

(a) a glass transition temperature (Tg) in the range of 70 to 120° C. as measured after cured by 1000-3000 mJ light irradiation (determined with respect to a 100 µm thick cured product based on its dynamic viscoelasticity obtained by a tensile mode with a heating rate of 5° C./min and a frequency of 10 Hz); and (b) a gel fraction of 75% by weight or above as measured after heat cured at 110 to 140° C. for 1 hour (determined with respect to 1 g of a 100 µm thick cured product by 3-hour Soxhlet extraction using methanol).

A method of manufacturing a liquid crystal display panel according to the present invention comprises performing one drop fill in which the liquid crystal sealing agent composition is light cured and is thereafter heat cured.

A liquid crystal display panel according to the present invention is obtained by the above method of manufacturing a liquid crystal display panel.

BEST MODE FOR CARRYING OUT THE INVENTION

Hereinbelow, the liquid crystal sealing agent composition used in the invention will be described in detail.

The liquid crystal sealing agent composition according to the present invention contains (1) a solid epoxy resin having a softening temperature by the ring and ball method of 40° C. or above, (2) an acrylate monomer and/or a methacrylate monomer, or an oligomer thereof, (3) a thermoplastic polymer having a softening temperature of 50 to 120° C., the thermoplastic polymer being obtained by copolymerizing an acrylate monomer and/or a methacrylate monomer with a monomer copolymerizable therewith, (4) a light-activated radical polymerization initiator, and (5) a latent epoxy curing agent. The composition may further contain (6) a partially esterified epoxy resin obtained by reacting an epoxy resin with a compound having at least one acryloyl or methacryloyl group and at least one carboxyl group in the molecule, (7) a filler, and (8) a further additive. These constituents are described in detail below.

<(1) Solid Epoxy Resin having Ring and Ball Method Softening Temperature of 40° C. or Above>

The solid epoxy resin (1) having a ring and ball method softening temperature of 40° C. or above may be, without limitation, any type of solid epoxy resins having the softening temperature of 40° C. or above. When the ring and ball method softening temperature of the solid epoxy resin is 40° C. or above, the liquid crystal sealing agent composition can give a light cured product of high glass transition temperature and a heat cured product having a high gel fraction, and further the light and heat cured product shows a high glass transition temperature.

The solid epoxy resin (1) preferably ranges in number-average molecular weight from 500 to 2000. When the number-average molecular weight is in this range, the solid epoxy resin shows low solubility and diffusibility in the liquid crystal, permits the obtainable liquid crystal display panel to exhibit excellent display characteristics, and has good compatibility with (2) the acrylate monomer and/or the methacrylate monomer, or the oligomer thereof. The number-average molecular weight of the epoxy resin can be measured by gel permeation chromatography (GPC) using polystyrene standard. The solid epoxy resin is preferably highly purified by molecular distillation or the like prior to use.

Specific examples of the solid epoxy resins (1) having a ring and ball method softening temperature of 40° C. or above include aromatic polyvalent glycidylether compounds obtained by reaction, with epichlorohydrin, of aromatic diols such as bisphenol A, bisphenol S, bisphenol F and bisphenol AD, or modified diols obtained by modifying the above diols with ethylene glycol, propylene glycol and alkylene glycol; novolak-type polyvalent glycidylether compounds obtained by reaction, with epichlorohydrin, of novolak resins derived from phenols or cresols and formaldehydes, or polyphenols such as polyalkenylphenols and copolymers thereof; and glycidylether compounds of xylylene phenolic resins.

More specifically, cresol novolak epoxy resin, phenol novolak epoxy resin, bisphenol A epoxy resin, bisphenol F epoxy resin, triphenolmethane epoxy resin, triphenolethane epoxy resin, trisphenol epoxy resin, dicyclopentadiene epoxy resin and biphenyl epoxy resin may be suitably used singly or in combination, provided that the ring and ball method softening temperature is 40° C.

The solid epoxy resin (1) is preferably contained in an amount of 5 to 40 parts by weight, and more preferably 10 to 30 parts by weight in 100 parts by weight of the liquid crystal sealing agent composition. When the content of the solid epoxy resin (1) is in this range, the liquid crystal sealing agent composition can give a light cured product of high glass transition temperature and a heat cured product having a high gel fraction, and further the light and heat cured product shows a high glass transition temperature.

Further, the solid epoxy resin (1) is preferably contained in an amount of 20 to 200 parts by weight per 100 parts by weight of the acrylate monomer and/or the methacrylate monomer, or the oligomer thereof (2) (described later). This ratio of the constituent (1) to the constituent (2) tends to lead to higher Tg of the light cured product and the light and heat cured product.

((Other Epoxy Resins))

The invention may employ other epoxy resin in combination with the aforesaid solid epoxy resin having a ring and ball method softening temperature of 40° C. or above, without deteriorating the characteristics of the liquid crystal sealing agent. Such other epoxy resins include aliphatic polyvalent glycidylether compounds obtained by reaction, with epichlorohydrin, of polyalkylene glycols such as ethylene glycol, diethylene glycol, triethylene glycol, polyethylene glycol, propylene glycol, dipropylene glycol, tripropylene glycol and polypropylene glycol, or polyhydric alcohols such as dimethylolpropane, trimethylolpropane, spiroglycol and glycerol; aromatic polyvalent glycidylether compounds obtained by reaction, with epichlorohydrin, of aromatic diols such as bisphenol A, bisphenol S, bisphenol F and bisphenol AD, or modified diols obtained by modifying the above diols with ethylene glycol, propylene glycol and alkylene glycol; aliphatic polyvalent glycidyl ester compounds obtained by reaction, with epichlorohydrin, of aliphatic dicarboxylic acids such as adipic acid and itaconic acid; aromatic polyvalent glycidyl ester compounds obtained by reaction, with epichlorohydrin, of aromatic dicarboxylic acids such as isophthalic acid, terephthalic acid and pyromellitic acid; aliphatic polyvalent glycidylether ester compounds, aromatic polyvalent glycidylether ester compounds and alicyclic polyvalent glycidylether compounds obtained by reaction, with epichlorohydrin, of hydroxydicarboxylic compounds; aliphatic polyvalent glycidylamine compounds obtained by reaction, with epichlorohydrin, of aliphatic diamines such as polyethylenediamine; aromatic polyvalent glycidylamine compounds obtained by reaction, with epichlorohydrin, of aromatic diamines such as diaminodiphenylmethane, aniline and methaxylylenediamine; hydantoin-type polyvalent glycidyl compounds obtained by reaction, with epichlorohydrin, of hydantoin and hydantoin derivatives; novolak-type polyvalent glycidylether compounds obtained by reaction, with epichlorohydrin, of novolak resins derived from phenols or cresols and formaldehydes, or polyphenols such as polyalkenylphenols and copolymers thereof; epoxidized diene polymers such as epoxidized polybutadiene and epoxidized polyisoprene; 3,4-epoxy-6-methylcyclohexylmethyl-3,4-epoxy-6-methylcyclohexane carbonate; bis(2,3-epoxycyclopentyl) ether; urethane-modified epoxy resins; polysulfide-modified epoxy resins; rubber-modified epoxy resins (modified with CTBN, ATBN, and the like); polyalkylene glycol-type epoxy resins; ether elastomer-containing bisphenol A epoxy resins; silicone rubber-modified epoxy resins; and acryl-modified epoxy resins.

<(2) Acrylate Monomer and/or Methacrylate Monomer, or Oligomer Thereof>

Examples of the acrylate monomers and/or the methacrylate monomers, or the oligomers thereof (2) include diacrylates and/or dimethacrylates of polyethylene glycol, propylene glycol and polypropylene glycol; tris(2-hydroxyethyl)isocyanurate diacrylate and/or dimethacrylate; diacrylates and/or dimethacrylates of diols obtained by adding at least 4 mol of ethylene oxide or propylene oxide to 1 mol of neopentyl glycol; diacrylates and/or dimethacrylates of diols obtained by adding 2 mol of ethylene oxide or propylene oxide to 1 mol of bisphenol A; di- or tri-acrylates and/or di- or tri-methacrylates of triols obtained by adding at least 3 mol of ethylene oxide or propylene oxide to 1 mol of trimethylolpropane; diacrylates and/or dimethacrylates of diols obtained by adding at least 4 mol of ethylene oxide or propylene oxide to 1 mol of bisphenol A; tris (2-hydroxyethyl)isocyanurate triacrylate and/or trimethacrylate; trimethylolpropane triacrylate and/or trimethacrylate, and oligomers thereof; pentaerythritol triacrylate and/or trimethacrylate, and oligomers thereof; dipentaerythritol polyacrylate and/or polymethacrylate; tris(acryloxyethyl)isocyanurate; caprolactone-modified tris(acryloxyethyl)isocyanurate; caprolactone-modified tris(methacryloxyethyl)isocyanurate; alkyl-modified dipentaerythritol polyacrylate and/or polymethacrylate; caprolactone-modified dipentaerythritol polyacrylate and/or polymethacrylate; neopentylglycol hydroxypivalate diacrylate and/or dimethacrylate; caprolactone-modified neopentylglycol hydroxypivalate diacrylate and/or dimethacrylate; ethylene oxide-modified phosphoric acid acrylate and/or dimethacrylate; ethylene oxide-modified alkylated phosphoric acid acrylates and/or dimethacrylates; and oligoacrylates and/or oligomethacrylates of neopentyl glycol, trimethylolpropane and pentaerythritol.

The acrylate monomer and/or the methacrylate monomer, or the oligomer thereof (2) used in the present invention preferably ranges in number-average molecular weight from 250 to 2000 and has a Fedors theoretical solubility parameter (sp value) in the range of 10.0 to 13.0 $(cal/cm^3)^{1/2}$. When the number-average molecular weight is in the above range, the acrylate monomer and/or the methacrylate monomer, or the oligomer thereof (2) shows low solubility and diffusibility in the liquid crystal, permits the obtainable liquid crystal display panel to exhibit excellent display characteristics, and has good compatibility with the solid epoxy resin (1). The number-average molecular weight of the acrylate monomer and/or the methacrylate monomer, or the oligomer thereof (2) can be measured by gel permeation chromatography (GPC) using polystyrene standard.

Many techniques and methods are known for calculating the solubility parameter (sp value). In the present invention, the theoretical solubility parameter is obtained based on the calculation method devised by Fedors (see, for example, Journal of The Adhesion Society of Japan, vol. 22, No. 10 (1986) (53) (566)). This calculation method does not require a density value and the solubility parameter can be easily calculated. The Fedors theoretical solubility parameter (sp value) can be derived from the following formula:

$$(\Sigma \Delta el / \Sigma \Delta vl)^{1/2}$$

wherein $\Sigma \Delta el = (\Delta H - RT)$ and $\Sigma \Delta vl$: molar volume sum When the solubility parameter (sp value) is in the above range, the acrylate monomer and/or the methacrylate monomer, or the oligomer thereof (2) shows low solubility in the liquid crystal, permits prevention of contamination of the liquid crystal, and permits the obtainable liquid crystal display panel to exhibit excellent display characteristics.

The solubility parameter in the above range leads to another advantage. That is, nucleophilic addition reaction favorably takes place between the acryloyl groups and/or methacryloyl groups of the acrylate monomer and/or the methacrylate monomer, or the oligomer thereof (2), and the active hydrogen of the latent epoxy curing agent (5). Namely, curing reaction takes place favorably in heat treatment, so that the curing properties in area shaded by the wiring are enhanced.

In the present invention, the aforementioned acrylate monomers and/or methacrylate monomers, or oligomers thereof (2) may be used in combination as a composition, in which case the theoretical solubility parameter (sp value) of the composition as a whole can be obtained based on the sum of the molar fractions of the acrylate monomers and methacrylate monomers, or oligomers thereof mixed together.

When the composition of the acrylate monomers and/or methacrylate monomers, or oligomers thereof (2) is used, the theoretical solubility parameter of the composition as a whole is preferably in the range of 10.0 to 13.0 $(cal/cm^3)^{1/2}$.

The acrylate monomers and/or methacrylate monomers, or oligomers thereof (2) having a number-average molecular weight of at least 250 and a Fedors theoretical solubility parameter (sp value) of 10.0 to 13.0 $(cal/cm^3)^{1/2}$, include pentaerythritol triacrylate (number-average molecular weight: 298, sp value: 11.1) and pentaerythritol tetraacrylate (number-average molecular weight: 352, sp value: 12.1).

The acrylate monomer and/or the methacrylate monomer, or the oligomer thereof (2) is preferably highly purified by washing with water or the like prior to use.

<(3) Thermoplastic Polymer Having Softening Temperature of 50 to 120° C. and Obtained by Copolymerizing Acrylate Monomer and/or Methacrylate Monomer with Monomer Copolymerizable Therewith>

The thermoplastic polymer (3) obtained by copolymerizing an acrylate monomer and/or a methacrylate monomer with a monomer copolymerizable therewith preferably has a softening temperature of 50 to 120° C., more preferably 60 to 80° C. The thermoplastic polymer having a softening temperature in this range can provide the following advantages. That is, when the liquid crystal sealing agent composition obtained is heated, the thermoplastic polymer is molten and becomes compatible with the constituents of the liquid crystal sealing agent composition, for example the solid epoxy resin (1) and the acrylate monomer and/or the methacrylate monomer, or the oligomer thereof (2). The compatibilized thermoplastic polymer is swollen to prevent viscosity decrease of the liquid crystal sealing agent composition before heat curing. Accordingly, the constituents of the liquid crystal sealing agent composition are prevented from exuding and diffusing into the liquid crystal.

The thermoplastic polymer may be of an uncrosslinked or crosslinked type, and may have a composite core-shell structure consisting of a crosslinked core layer and an uncrosslinked shell layer.

In view of good dispersibility in the liquid crystal sealing agent composition, the thermoplastic polymer has an average particle diameter in the range of 0.05 to 5 μm, and preferably 0.07 to 3 μm.

The thermoplastic polymer may be arbitrarily selected from among known thermoplastic polymers. Specifically, the polymer may be obtained as an emulsion by copolymerizing 50 to 99.9% by weight, preferably 60to 80% by weight of an acrylate monomer and/or amethacrylate monomer with 0.1 to 50% by weight, preferably 20 to 40% by weight of a monomer copolymerizable therewith.

The acrylate monomers and/or methacrylate monomers include:

monofunctional acrylate monomers such as methyl acrylate, ethyl acrylate, propyl acrylate, butyl acrylate, 2-ethylhexyl acrylate, amyl acrylate, hexadecyl acrylate, octadecyl acrylate, butoxyethyl acrylate, phenoxyethyl acrylate, 2-hydroxyethyl acrylate and glycidyl acrylate; and monofunctional methacrylate monomers such as methyl methacrylate, ethyl methacrylate, propyl methacrylate, butyl methacrylate, 2-ethylhexyl methacrylate, amyl methacrylate, hexadecyl methacrylate, octadecyl methacrylate, butoxyethyl methacrylate, phenoxyethyl methacrylate, 2-hydroxyethyl methacrylate and glycidyl methacrylate. Of these, methyl acrylate, methyl methacrylate, butyl acrylate, 2-ethylhexyl methacrylate and 2-ethylhexyl methacrylate are preferred. They may be used-singly or in combination.

The monomers copolymerizable with the acrylate monomers and/or methacrylate monomers include acrylamides; acid monomers such as acrylic acid, methacrylic acid, itaconic acid and maleic acid; aromatic vinyl compounds such as styrene and styrene derivatives; conjugated dienes such as 1,3-butadiene, 1,3-pentadiene, isoprene, 1,3-hexadiene and chloroprene; and polyfunctional monomers such as divinylbenzene and diacrylates. They may be used singly or in combination.

Of these, at least one monomer selected from the group consisting of the acrylamides, the acid monomers and the aromatic vinyl compounds is preferably used when the thermoplastic polymer is uncrosslinked. When the thermoplastic polymer is of a crosslinked or composite type, either the conjugated diene or the polyfunctional monomer is essentially used, and at least one monomer selected from the group consisting of the acrylamides, the acid monomers and the aromatic vinyl compounds may be used as required.

The thermoplastic polymer may be of an uncrosslinked or crosslinked type, and may have a composite core-shell structure consisting of a crosslinked core layer and an uncrosslinked shell layer. Preferably, the thermoplastic polymer comprises substantially spherical particles having a composite core-shell structure.

The core layer of the core-shell structure comprises an elastomer obtained by copolymerizing the acrylate monomer and/or the methacrylate monomer with the monomer copolymerizable therewith.

Specifically, the core layer preferably comprises an elastomer that is obtained by copolymerizing 30 to 99.9% by weight of the acrylate monomer and/or the methacrylate monomer, with 0.1 to 70% by weight of the monomer copolymerizable therewith.

The monomer copolymerizable with the acrylate monomer and/or the methacrylate monomer for forming the core layer may be selected such that either the conjugated diene or the polyfunctional monomer is essentially used, and at least one monomer selected from the group consisting of the acrylamides, the acid monomers and the aromatic vinyl compounds is used according to necessity.

In the above case, the shell layer is obtained by copolymerizing the acrylate monomer and/or the methacrylate monomer with the monomer copolymerizable therewith. As the monomer copolymerizable with the acrylate monomer and/or the methacrylate monomer, at least one monomer selected from the group consisting of the acrylamides, the acid monomers and the aromatic vinyl compounds is preferably used.

As described above, the thermoplastic polymer comprises substantially spherical particles having the core-shell structure in which the crosslinked core layer given a lightly crosslinked structure is enveloped by the uncrosslinked shell layer. This structure enables the thermoplastic polymer to function also as stress relaxation agent in the liquid crystal sealing agent composition.

In the invention, the thermoplastic polymer is preferably used after the particle surface thereof is lightly crosslinked. A preferable method for lightly crosslinking the thermoplastic polymer particle surface is ionomer crosslinking in which the epoxy group, carboxyl group and amino group present on the thermoplastic polymer particle surface are metal crosslinked.

The lightly crosslinked structure imparted to the particle surface enables the thermoplastic polymer to become less soluble in the epoxy resin and solvent at room temperature, leading to improved storage stability.

The thermoplastic polymer is contained in an amount of 2 to 40 parts by weight, and preferably 5 to 25 parts by weight in 100 parts by weight of the liquid crystal sealing agent composition. This thermoplastic polymer content leads to good sealing appearance, prevention of exuding and diffusion of the constituents of the liquid crystal sealing agent composition into the liquid crystal, and suppression of the resin viscosity increase, permitting the workability to be maintained.

<(4) Light-Activated Radical Polymerization Initiator>

The light-activated radical polymerization initiators (4) for use in the present invention are not particularly limited, and known compounds can be employed. Specific examples thereof include benzoin compounds, acetophenones, benzophenones, thioxanthones, α-acyloxym esters, phenylglyoxylates, benzyls, azo compounds, diphenyl sulfide compounds, acylphosphine oxide compounds, organic dye compounds and iron-phthalocyanine compounds. The light-activated radical polymerization initiator is used in an amount of 0.01 to 5 parts by weight in 100 parts by weight of the liquid crystal sealing agent composition. The amount not less than 0.01 part by weight provides a curing effect by light irradiation. The amount not more than 5 parts by weight leads to good application stability of the liquid crystal sealing agent composition and enables the composition to give a uniform cured product by light curing.

<(5) Latent Epoxy Curing Agent>

The latent epoxy curing agent (5) may be a known one. From the viewpoint of obtaining a one-component composition with good viscosity stability, organic acid dihydrazide compounds, imidazoles, imidazol derivatives, dicyandiamides and aromatic amines are preferable. These may be used singly or in combination.

Of the above compounds as the latent epoxy curing agents (5), amine-type latent curing agents whose melting point or ring and ball method softening temperature is 100° C. or above are more preferable.

The use of the amine-type latent curing agent provides the following advantage. When heated, the active hydrogen of the amine-type latent curing agent shows favorable nucleophilic addition characteristics to the acryloyl group and/or methacryloyl group of the constituent (2) molecule, with the result that heat curing properties in the shaded area are improved. Accordingly, good display characteristics and reliability can be achieved in the vicinity of the shaded area of a liquid crystal display panel. When the amine-type latent curing agent has a melting point or ring and ball method softening temperature of 100° C. or above, the viscosity stability can be favorably maintained at room temperature to permit long-duration service in screen printing or dispenser application.

Specific examples of the latent epoxy curing agents (5) that are the amine-type latent curing agents and have a melting point or ring and ball method softening temperature of 100° C. or above include dicyandiamides such as dicyandiamide (melting point: 209° C.); organic acid dihydrazides such as adipic acid dihydrazide (melting point: 181° C.) and 1,3-bis (hydrazinocarboethyl)-5-isopropylhydantoin (melting point: 120° C.); and imidazol derivatives such as 2,4-diamino-6-[2'-ethylimidazolyl-(1')]-ethyl triazine (melting point: 215-225° C.) and 2-phenylimidazol (melting point: 137-147° C.).

The latent epoxy curing agent (5) is generally contained in an amount of 1 to 25 parts by weight, and preferably 5 to 15 parts by weight in 100 parts by weight of the liquid crystal sealing agent composition. When the latent epoxy curing agent has this content, bonding reliability is exhibited in the obtainable liquid crystal display panel and the liquid crystal sealing agent composition maintains viscosity stability.

The latent epoxy curing agent (5) is preferably highly purified by water washing, recrystallization or the like prior to use.

<(6) Partially Esterified Epoxy Resin Obtained by Reacting Epoxy Resin with Compound Having at Least One Acryloyl or Methacryloyl Group and at Least One Carboxyl Group in Molecule>

The epoxy resin to be esterified is not particularly limited, and may be selected from the aforementioned epoxy resins. To produce the partially esterified epoxy resin, the epoxy resin is reacted with a compound that has at least one acryloyl or methacryloyl group and at least one carboxyl group in the molecule, in the presence of a basis catalyst that is used in 0.4-0.9 fold equivalent weight relative to the equivalent weight of the epoxy group.

Specific examples of the compounds having at least one acryloyl or methacryloyl group and at least one carboxyl group in the molecule include acrylic acid, methacrylic acid, 2-methacryloyloxyethyl phthalate, 2-methacryloyloxyethyl succinate, 2-methacryloyloxyethyl hydrophthalate, 2-methacryloyloxyethyl maleate, 2-methacryloyloxypropyl phthalate, 2-methacryloyloxypropyl succinate, 2-methacryloyloxypropyl maleate, 2-acryloyloxyethyl succinate, 2-acryloyloxyethyl phthalate, 2-acryloyloxyethyl hydrophthalate, 2-acryloyloxyethyl maleate, 2-acryloyloxypropyl phthalate, 2-acryloyloxypropyl succinate and 2-acryloyloxypropyl maleate. Of these, preferable are methacrylic acid, 2-methacryloyloxyethyl phthalate, 2-methacryloyloxyethyl succinate, 2-methacryloyloxyethyl hydrophthalate, 2-methacryloyloxyethyl maleate, 2-methacryloyloxypropyl phthalate, 2-methacryloyloxypropyl succinate and 2-methacryloyloxypropyl maleate.

Particularly, the compounds having at least one methacryloyl group and at least one carboxyl group in the molecule are preferable, with examples including methacrylic acid, 2-methacryloyloxyethyl phthalate, 2-methacryloyloxyethyl succinate, 2-methacryloyloxyethyl hydrophthalate, 2-methacryloyloxyethyl maleate, 2-methacryloyloxypropyl phthalate, 2-methacryloyloxypropyl succinate and 2-methacryloyloxypropyl maleate. The use of such compounds tends to lead to higher glass transition temperature (Tg) of the light cured product and misalignment of the glass substrates can be prevented.

The partially esterified epoxy resin (6) has an epoxy group, and an acryloyl group and/or a methacryloyl group in the resin skeleton, so that it possesses high compatibility with (2) the acrylate monomer and/or the methacrylate monomer, or the oligomer thereof and (1) the solid epoxy resin having a ring and ball method softening temperature of 40° C. or above in the liquid crystal sealing agent composition. Consequently, the light cured product has a higher glass transition temperature (Tg) and exhibits bonding reliability.

The partially esterified epoxy resin (6) is preferably contained in an amount such that the liquid crystal sealing agent composition contains the solid epoxy resin (1) having a ring and ball method softening temperature of 40° C. or above and the acrylate monomer and/or the methacrylate monomer, or the oligomer thereof (2) in a total amount of 160 to 800 parts by weight per 100 parts by weight of the partially esterified epoxy resin (6).

This content of the partially esterified epoxy resin (6) tends to lead to higher glass transition temperature (Tg) of the light cured product and higher gel fraction of the heat cured product.

The partially esterified epoxy resin (6) is preferably highly purified by water washing or the like prior to use.

<(7) Filler>

The liquid crystal sealing agent composition may contain a filler (7). Any fillers (7) commonly used in the electronic material field are employable. Specific examples include inorganic fillers such as calcium carbonate, magnesium carbonate, barium sulfate, magnesium sulfate, aluminum silicate, zirconium silicate, iron oxide, titanium oxide, aluminum oxide (alumina), zinc oxide, silicon dioxide, potassium titanate, kaolin, talc, asbestos powder, quartz powder, mica and glass fiber. Further, known organic fillers are employable, with examples including polymethyl methacrylate, polystyrene, and copolymers (exclusive of the thermoplastic polymer (3)) obtained by copolymerizing a monomer copolymerizable with the monomers of these polymers. The filler (7) may be graft modified with an epoxy resin or a silane coupling agent.

The filler for use in the invention has a maximum particle diameter of not more than 10 μm, preferably not more than 6 μm, and further preferably not more than 4 μm as determined by laser diffractometry. When the filler's maximum particle diameter is within this range, the cell gap size stability is further improved in the manufacture of liquid crystal cell.

The filler is preferably used in an amount of 1 to 40 parts by weight, and more preferably 10 to 30 parts by weight per 100 parts by weight of the liquid crystal sealing agent composition exclusive of the filler. When the filler is used in the above amount, the liquid crystal sealing agent composition exhibits good application stability on the glass substrate and shows satisfactory light curing properties, so that the size stability of cell gap width is improved.

<(8) Further Additives>

Where required, further additives may be used, and examples thereof include heat-activated radical generators, coupling agents such as silane coupling agents, ion-trapping agents, ion-exchange agents, leveling agents, pigments, dyes, plasticizers and antifoaming agents. Spacers or the like may be incorporated for ensuring the desired cell gap.

<Preparation Method of Liquid Crystal Sealing Agent Composition>

There is particularly no limitation on the method of preparing the liquid crystal sealing agent composition, and the composition may be obtained by mixing the aforesaid constituents by a conventional method. The mixing may be performed by means of known kneading apparatuses, such as double arm mixers, roll kneaders, twin-screw extruders and ball mills. The thus-prepared composition can be finally vacuum degassed, can thereafter be filled in a glass bottle or a plastic container followed by sealing, and can be stored or transported.

<Characteristics of Liquid Crystal Sealing Agent Composition>

The liquid crystal sealing agent composition according to the present invention is a light and heat curable resin composition and preferably has a glass transition temperature (Tg) in the range of 70 to 120° C. as measured with respect to a 100 μm thick cured product obtained by 1000-3000 mJ light irradiation, based on dynamic viscoelasticity of the cured product by a tensile mode with a heating rate of 5° C./min and a frequency of 10 Hz. When the glass transition temperature (Tg) determined from the dynamic viscoelasticity of the light cured product is in the above range, excellent cell gap formation characteristics are achieved after the light curing and misalignment of the glass substrates can be prevented.

A preferred embodiment for forming a curried product by light irradiation will be given below. In the light irradiation, the integrated quantity of light is measured, as follows. When a cured product is formed by UV irradiation, use is made of a UV integrating actinometer with 300-390 nm wavelength measurement range and 354 nm peak sensitivity wavelength. As a UV irradiation device, a metal halide lamp having a UV irradiation illumination of 100 mW/cm$^2$ (365 nm) is used. A cured product is obtained by curing with an integrated quantity of light of 1000 to 3000 mJ.

The dynamic viscoelasticity of the cured product is measured with Rheolograph-Solid L-1R (manufactured by Toyo Seiki Seisaku-sho, Ltd.) by a tensile mode with a frequency of 10 Hz and a heating rate of 5° C./min. The peak top temperature of loss tangent (Tanδ) is obtained as the glass transition temperature (Tg).

Further, the liquid crystal sealing agent composition preferably has a gel fraction of 75% by weight or above as measured by 3-hour Soxhlet extraction using methanol with respect to 1 g of a 100 μm thick cured product obtained by heat curing at 110 to 140C for 1 hour. When the heat cured product has this gel fraction, good curing properties can be achieved in area shaded by the wiring and a liquid crystal display cell can exhibit satisfactory display characteristics in the vicinity of the shaded area.

To determine the gel fraction, 1 g of a 100 μm thick cured product obtained by heat curing at 110 to 140° C. for 1 hour is subjected to Soxhlet extraction using 100 g of methanol as extraction solvent. After the extraction has been performed for 3 hours under reflux conditions, the cured product is dried at 105° C. for 3 hours. The gel fraction of the cured product is calculated by the following formula, based on the weight change of the cured product brought about the extraction.

$$\text{Heat cured product's gel fraction (\%)} = \frac{\text{Cured product weight after methanol extraction and drying}}{\text{Cured product weight before methanol extraction}} \times 100$$

The viscosity of the liquid crystal sealing agent composition as measured prior to the curing is not particularly limited, and is preferably in the range of 30 to 1000 Pa·s, and more preferably 100 to 500 Pa·s as determined at 25° C. with an E-type viscometer.

<Properties of Liquid Crystal Sealing Agent Composition>

There is particularly no limitation on the thixotropic index, which is expressed as a ratio of viscosity values obtained with use of E-type viscometers of the same rotor number, for example the ratio between a 5 rpm viscosity value obtained at a shear rate of 10 rpm and a 0.5 rpm viscosity value obtained at a shear rate of 1 rpm (0.5 rpm viscosity value/5 rpm viscosity value). Preferably, the thixotropic index is in the range of 1 to 5.

<Liquid Crystal Display Panel and Manufacturing Method Thereof>

The liquid crystal display panel according to the present invention is manufactured by a one drop fill process using the aforementioned liquid crystal sealing agent composition. A specific example, of the manufacturing method will be given below.

A spacer corresponding to a predetermined gap width is mixed with the liquid crystal sealing agent composition. A pair of liquid crystal cell glass substrates are prepared, on one of which the liquid crystal sealing agent composition is applied in a frame pattern by use of a dispenser. A liquid crystal material is precisely dropped within the frame such that the liquid crystal amount will correspond to the internal volume of a panel to be fabricated by laminating together the substrates. Subsequently, the counter glass substrate is superposed, and the glass substrates are laminated together by UV irradiation at 1000 to 18000 mJ under pressure. Thereafter, the laminate is heated at 110 to 140° C. for 1 hour without pressurization, so that the composition is sufficiently cured. Thus, a liquid crystal display panel is manufactured.

The liquid crystal cell substrates may be glass substrates or plastic substrates. These substrates, as a matter of course, are the liquid crystal cell-specific glass or plastic substrates in which transparent electrodes typically of indium oxide, alignment layers typically of polyimides, and inorganic ion-shielding layers are provided at appropriate parts.

There is particularly no limitation on the method for applying the liquid crystal sealing agent composition on the liquid crystal cell substrate. For example, screen printing or dispenser application may be employed.

The liquid crystal material is not limited, and is suitably a nematic liquid crystal.

Suitable liquid crystal display elements to which the liquid crystal display panel of the invention can be applied include TN (twisted nematic) liquid crystal elements and STN (super twisted nematic) liquid crystal elements proposed by M. Schadt and W. Helfrich, ferroelectric liquid crystal elements proposed by N. A. Clark and S. T. Lagerwall, and liquid crystal display elements provided with thin film transistors (TFT) on a pixel to pixel basis.

EFFECT OF THE INVENTION

The present invention provides the light and heat curable liquid crystal sealing agent composition that is employable in the one drop fill, is excellent in properties of a cured product particularly after the first-stage light curing, achieves stable cell gap after cell gap formation, permits prevention of contamination of the liquid crystal in the second-stage heat curing, is excellent in curing properties in the shaded area, and shows superior bonding reliability.

Moreover, the present invention provides the liquid crystal display panel obtained using the liquid crystal sealing agent composition that is excellent in display characteristics, particularly in liquid crystal display characteristics in area shaded by the wiring.

EXAMPLES

Hereinbelow, the present invention will be described in greater detail by representative examples. However, it should be construed that the invention is not limited thereto. Unless otherwise mentioned, the percentage % and part(s) refer to % by weight and part(s) by weight.

<Ingredients Used>

(1) Solid Epoxy Resin Having Ring and Ball Method Softening Temperature of 40° C. or Above As the solid epoxy resin (1), o-cresol novolak-type solid epoxy resin "EOCN-1020-75" (trade name, available from NIPPON KAYAKU CO., LTD.) (ring and ball method softening temperature: 75° C., GPC number-average molecular weight: 1100) was used.

Other epoxy resin was used, which was bisphenol F-type liquid epoxy resin "EPICLON 830S" (trade name, available from DAINIPPON INK AND CHEMICALS, INC.).

(2) Acrylate Monomer and/or Methacrylate Monomer, or Oligomer Thereof

As the acrylate monomer and/or the methacrylate monomer, or the oligomer thereof (2), pentaerythritol triacrylate "BISCOAT 300" (trade name, available from OSAKA ORGANIC CHEMICAL INDUSTRY LTD.) (sp value: 11.1, number-average molecular weight: 298) and pentaerythritol tetraacrylate "BISCOAT 400" (trade name, available from OSAKA ORGANIC CHEMICAL INDUSTRY LTD.) (sp value: 12.1, number-average molecular weight: 352) were used in highly purified form brought about by repeating three times dilution and washing with toluene and ultrapure water.

(3) Thermoplastic Polymer Obtained by Copolymerizing Acrylate Monomer and/or Methacrylate Monomer with Monomer Copolymerizable Therewith and Having Ring and Ball Method Softening Temperature of 50 to 120° C.

A thermoplastic polymer synthesized in accordance with Synthesis Example 1 was used as the thermoplastic polymer (3).

A thermoplastic polymer synthesized in accordance with Synthesis Example 2 was used as other thermoplastic polymer that does not meet the conditions of the above thermoplastic polymer.

Synthesis Example 1

Synthesis of Thermoplastic Polymer (3)

A 1000-ml four-necked flask equipped with a stirrer, a nitrogen inlet tube, a thermometer and a reflux condenser tube was charged with 400 g of ion-exchange water and 1.0 g of sodium alkyldiphenyletherdisulfonate, followed by heating to 65° C. After addition of 0.4 g of potassium persulfate, a mixed solution emulsified with a homogenizer was added dropwise over a period of 4 hours, which mixed solution consisted of 1.2 g of t-dodecylmercaptane, 156 g of n-butyl acrylate, 4.0 g of divinylbenzene, 3.0 g of sodium alkyldiphenyletherdisulfonate, and 200 g of ion-exchange water. Reaction was continuously carried out for 2 hours after the dropwise addition. Thereafter, 232 g of methyl methacrylate was added all at once, and reaction was continuously performed for 1 hour. Subsequently, 8 g of acrylic acid was continuously added over a period of 1 hour, and reaction was carried out for 2 hours at a constant temperature of 65° C., followed by cooling. The pH was neutralized to 7 using potassium hydroxide, and an emulsion solution with a solid content of 40.6% by weight was obtained. 1000 g of the emulsion solution was dried with a spray dryer to give approximately 400 g of high softening temperature particles with a moisture content of not more than 0.1%. The softening temperature of the particles was 80° C. Particle diameter measurement of the high softening temperature particles with N-4-Coulter counter resulted in an average particle diameter of 180 nm.

Synthesis Example 2

Synthesis of Other Thermoplastic Polymer

A 1000-ml four-necked flask equipped with a stirrer, a nitrogen inlet tube, a thermometer and a reflux condenser tube was charged with 400 g of ion-exchange water and 1.0 g of sodium alkyldiphenyletherdisulfonate, followed by heating to 65° C. After addition of 0.4 g of potassium persulfate, a mixed solution emulsified with a homogenizer was added dropwise over a period of 4 hours, which mixed solution consisted of 1.2 g of t-dodecylmercaptane, 156 g of n-butyl acrylate, 4.0 g of divinylbenzene, 3.0 g of sodium alkyldiphenyletherdisulfonate, and 200 g of ion-exchange water. Reaction was continuously carried out for 2 hours after the dropwise addition. Thereafter, 142 g of methyl methacrylate and 90 g of n-butyl acrylate were added all at once, and reaction was continuously performed for 1 hour. Subsequently, 8 g of acrylic acid was continuously added over a period of 1 hour, and reaction was carried out for 2 hours at a constant temperature of 65° C., followed by cooling. The pH was neutralized to 7 using potassium hydroxide, and an emulsion solution with a solid content of 40.8% by mass was obtained.

1000 g of the emulsion solution was dried with a spray dryer to give approximately 400 g of a thermoplastic polymer with a moisture content of not more than 0.1%. The softening temperature of the fine particles was 40° C.

Particle diameter measurement of the thermoplastic polymer with N-4-Coulter counter resulted in an average particle diameter of 250 nm.

(4) Light-Activated Radical Polymerization Initiator

As the light-activated radical polymerization initiator, 1-hydroxy-cyclohexyl-phenyl-ketone "IRGACURE 184" (trade name, available from Ciba Specialty Chemicals, Inc.) was used.

(5) Latent Epoxy Curing Agent

As the latent epoxy curing agents, 1,3-bis(hydrazinocarboethyl)-5-isopropylhydantoin "AMICURE VDH-J" (trade name, available from AJINOMOTO CO,. LTD.) and 2,4-diamino-6-[2'-ethyl-4'-methylimidazolyl-(1')]-ethyl-s-triadine "CUREZOL 2E4MZ-A" (trade name, available from Shikoku Corporation) were used.

(6) Partially Esterified Epoxy Resin Obtained by Reacting Epoxy Resin with Compound Having at Least One Acryloyl or Methacryloyl Group and at Least One Carboxyl Group in Molecule Partially esterified resins synthesized by Synthesis Examples 3 and 4 were used as the partially esterified epoxy resins.

Synthesis Example 3

Synthesis 1 of Partially Esterified Epoxy Resin

A 500-ml four-necked flask equipped with a stirrer, a gas inlet tube, a thermometer, and a cooling tube was charged with 160 g of a bisphenol F-type epoxy resin ("EPOTOHTO YDF-8170C" available from TOHTO KASEI CO., LTD.), 115 g of 2-methacryloyloxyethyl succinate ("NK ester SA" available from Shin-Nakamura Chemical Corporation) and 0.2 g of triethanolamine. These compounds were mixed and stirred at 110° C. for 5 hours under dry air stream to yield a methacryloyl group-containing partially esterified epoxy resin. The material obtained was washed three times with ultrapure water.

Synthesis Example 4

Synthesis 2 of Partially Esterified Epoxy Resin

A 500-ml four-necked flask equipped with a stirrer, a gas inlet tube, a thermometer, and a cooling tube was charged with 160 g of a bisphenol F-type epoxy resin ("EPOTOHTO YDF-8170C" available from TOHTO KASEI CO., LTD.), 43 g of methacrylic acid and 0.2 g of triethanolamine. These compounds were mixed and stirred at 110° C. for 5 hours under dry air stream to yield a methacryloyl group-containing partially esterified epoxy resin. The material obtained was washed three times with ultrapure water.

(7) Filler

Ultrapure silica "SO-E1" (trade name, available from ADMATECHS CO., LTD.) (average particle diameter: 0.3 μm) was used as the filler.

(8) Additive

As the additive, a silane coupling agent was used, which was γ-glycidoxy trimethoxysilane "KBM403" (trade name, available from Shin-Etsu Chemical Co., Ltd.).

<Testing Methods>

((Viscosity Stability))

100 parts of the liquid crystal sealing agent composition was placed in a polyethylene container, followed by sealing. The composition was stored at −10° C. for 30 days, and the rate of viscosity change was obtained relative to the 25° C. viscosity (viscosity value: 100) at the time of sealing. In Examples, the rates of change less than 10%, 10-50% and above 50% are represented by A (good storage stability), B (rather unsatisfactory storage stability) and C (bad storage stability) respectively.

((Measurement of Glass Transition Temperature (Tg) of Light Cured Product))

The liquid crystal sealing agent composition was applied in a thickness of 120 μm, and the coating was cured by 2000 mJ UV irradiation at 100 mW/cm$^2$ with use of a UV irradiation device (manufactured by TOSHIBA CORPORATION), resulting in formation of a 100 μm thick cured product. The light source was a metal halide lamp. To measure the integrated quantity of light, a UV integrating actinometer was employed which had 300-390 nm wavelength measurement range and 354 nm peak sensitivity wavelength ("UVR-T35" manufactured by TOPCON CORPORATION).

To determine the dynamic viscoelasticity of the cured product, measurement was carried out at a frequency of 10 Hz and a heating rate of 5° C./min with use of Rheograph-Solid L-1R manufactured by Toyo Seiki Seisakusho, Ltd., and the peak top temperature of loss tangent (Tanδ) was obtained as the glass transition temperature (Tg).

((Measurement of Gel Fraction of Heat Cured Product))

The liquid crystal sealing agent composition was applied in an approximate thickness of 120 μm, and the coating was heated in an oven in a nitrogen atmosphere at 120° C. for 60 minutes to give a cured product 100 μm thick. 1.0 g of the heat cured product was subjected to Soxhlet extraction using 100 g of methanol as extraction solvent. After the extraction had been performed for 3 hours under reflux conditions, the cured product was dried at 105° C. for 3 hours. The gel fraction of the heat cured product was calculated by the following formula, based on the weight change of the cured product brought about the extraction.

$$\text{Heat cured product's gel fraction (\%)} = \frac{\text{Cured product weight after methanol extraction and drying}}{\text{Cured product weight before methanol extraction}} \times 100$$

((Cell Gap Size Stability Test))

50 g of the liquid crystal sealing agent composition was mixed with 1 g of 5 μm-glass fibers as a spacer, and the mixture was stirred. The spacer-impregnated liquid crystal sealing agent composition was applied over a 100 mm×100 mm glass substrate. A counter glass substrate was superposed. Under pressure, the laminate was exposed to 2000 mJ UV irradiation at 100 mW/cm$^2$ with use of a UV irradiation device (manufactured by TOSHIBA CORPORATION) to perform light curing. Thereafter, the laminate was heated at 70° C. for 1 hour without pressurization. The cell gap and the panel misalignment were observed with a microscope.

In Examples, the cell gap size stability is represented by A (good size stability with the cell gap maintained at 5 μm and no panel misalignment) and B (cell gap over 5 μm and panel misalignment).

((Bonding Strength Measurement Test of Light Cured Liquid Crystal Sealing Agent Composition))

The liquid crystal sealing agent composition impregnated with 5 μm glass fibers was screen printed in a 1 mm-diameter circular pattern on a 25 mm×45 mm alkali-free glass 5 mm thick. A similar counter glass was crosswise superposed. Under pressure, the laminate was exposed to 2000 mJ UV irradiation at 100 mW/cm$^2$ with use of a UV irradiation device (manufactured by TOSHIBA CORPORATION) to perform light curing. Thus, a light cured specimen was prepared. The plane tensile strength of the specimen was measured.

((Bonding Strength Measurement Test of Light and Heat Cured Liquid Crystal Sealing Agent Composition))

The above light cured bonding test specimen was heat treated in an oven in a nitrogen atmosphere at 120° C. for 60 minutes. The thus-treated specimen was subjected to plane tensile strength measurement at a stress rate of 2 mm/min with use of tensile tester model 210 (manufactured by INTESCO Co., Ltd.).

((Display Characteristics Test of Liquid Crystal Display Panel))

On a 40 mm×45 mm glass substrate (RT-DM88PIN, manufactured by EHC) provided with transparent electrodes and an alignment layer, the liquid crystal sealing agent composition impregnated with 1 parts by weight of 5 μm glass fibers was applied in a 35 mm×40 mm frame pattern and in line width of 0.5 mm and a thickness of 50 μm by use of a dispenser (SHOTMASTER, manufactured by MUSASHI ENGINEERING, INC.). A liquid crystal material (MLC-11900-000, manufactured by MERCK) was precisely dropped within the frame with a dispenser such that the liquid crystal amount would correspond to the internal volume of a panel to be fabricated by laminating together the substrates. Subsequently, a counter glass substrate was superposed under reduced pressure, and the glass substrates were laminated together and fixed under pressure. The laminate was exposed to 2000 mJ UV irradiation at 100 mW/cm$^2$ with use of a UV irradiation device (manufactured by TOSHIBA CORPORATION) to perform light curing. Thereafter, the laminate was heated at 120° C. for 60 minutes in a nitrogen atmosphere, and polarizing films were stuck to both of the laminate surfaces.

The panel display characteristics were evaluated based on whether or not the liquid crystal display in the vicinity of the liquid crystal sealing agent functioned normally from the start of operation when the above-fabricated liquid crystal panel was operated by applying a voltage of 5 V with use of a direct current power source. The display characteristics were evaluated by giving A (good display characteristics) when the liquid crystal display function was exhibited to the seal edge, B (rather unsatisfactory display characteristics) when the liquid crystal display was abnormal within 1 mm from the seal edge, and C (remarkably inferior display characteristics) when the display function was abnormal 1.1 mm or more away from the seal edge.

((Display Characteristics Test of Shaded Area of Liquid Crystal Display Panel))

On a 40 mm×45 mm glass substrate (RT-DM88PIN, manufactured by EHC) provided with transparent electrodes and an alignment layer, the liquid crystal sealing agent composition impregnated with 1% by weight of 5 μm glass fibers was applied in a 35 mm×40 mm frame pattern and in line width of 0.5 mm by use of a dispenser (SHOTMASTER, manufactured by MUSASHI ENGINEERING, INC.). A liquid crystal material (MLC-11900-000, manufactured by MERCK) was precisely dropped within the frame with a dispenser such that the liquid crystal amount would correspond to the internal volume of a panel to be fabricated by laminating together the substrates. Subsequently, a counter glass substrate was superposed under reduced pressure, and the glass substrates were laminated together and fixed under pressure. Of the upper substrate, an area corresponding to the seal was covered with an aluminum tape so that the seal would be prevented from direct UV irradiation. Subsequently, light curing and heat curing were performed in the same manners as in the above display characteristics test of liquid crystal display panel. Thus, a liquid crystal display panel with a shaded area was fabricated. The display function of the liquid crystal display panel in the vicinity of the seal edge was evaluated in the same manner as aforementioned. The liquid crystal display function was evaluated by giving A (good display characteristics) when the liquid crystal display function was exhibited to the seal edge, B (rather unsatisfactory display characteristics) when the liquid crystal display was abnormal within 1 mm from the seal edge, and C (remarkably inferior display characteristics) when the display function was abnormal 1.1 mm or more away from the seal edge.

Example 1

15 parts of o-cresol novolak epoxy resin (EOCN-1020-75, available from NIPPON KAYAKU CO., LTD.) as the solid epoxy resin was dissolved by heating in 20 parts of pentaerythritol triacrylate (BISCOAT V 300, available from OSAKA ORGANIC CHEMICAL INDUSTRY LTD.) to give a uniform solution. The solution was combined with: 15 parts of the thermoplastic polymer synthesized in Synthesis Example 1; 2 parts of light-activated radical polymerization initiator 1-hydroxy-cyclohexyl-phenyl-ketone (IRGACURE 184, available from Ciba Specialty Chemicals, Inc.); 6 parts and 1 part of latent epoxy curing agents 1,3-bis(hydrazinocarboethyl)-5-isopropylhydantoin (AMICURE VDH-J, available from AJINOMOTO CO,. LTD.) and 2,4-diamino-6-[2'-ethyl-4'-methylimidazolyl-(1')]-ethyl-s-triadine (CUREZOL 2E4MZ-A, available from Shikoku Corporation) respectively; 20 parts of the partially esterified epoxy resin synthesized in Synthesis Example 3; 20 parts of filler ultrapure silica (SO-E1, available from ADMATECHS CO., LTD.); and 1 part of additive γ-glycidoxypropyl trimethoxysilane. They were pre-mixed with a mixer and were thereafter kneaded with a three-roll mill until the solid ingredients became of a size of 5 μm or below. The kneaded product was vacuum degassed to give a liquid crystal sealing agent composition (P1).

The liquid crystal sealing agent composition (P1) had a 25° C. initial viscosity of 300 Pa·s by an E-type viscometer. Table 2 shows the measurement and test results obtained with the liquid crystal sealing agent composition (P1) on viscosity stability, glass transition temperature of light cured product, gel fraction of heat cured product, cell gap size stability, bonding strength after light curing, bonding strength after light and heat curing, and display characteristics of liquid crystal display panel.

Examples 2-4

Liquid crystal sealing agent compositions P2 to P4 were produced in the same manner as in Example 1 according to the formulation given in Table 1. Evaluations were carried out by the methods described in Example 1. The results are shown in Table 2.

Comparative Example 1

A liquid crystal sealing agent composition (C1) was produced in the same manner as in Example 1, except that the epoxy resin used was a liquid epoxy resin that was outside the scope of the invention. Evaluations were carried out by the methods described in Example 1. The results are shown in Table 2.

Comparative Example 2

A liquid crystal sealing agent composition (C2) was produced in the same manner as in Example 1, except that no thermoplastic polymer was used. Evaluations were carried out by the methods described in Example 1. The results are shown in Table 2.

Comparative Example 3

A liquid crystal sealing agent composition (C3) was produced in the same manner as in Example 1, except that the thermoplastic polymer was replaced with 15 parts of the thermoplastic polymer synthesized in Synthesis Example 2 whose softening temperature was outside the scope of the invention. The resultant liquid crystal sealing agent composition had inferior viscosity stability such that the viscosity change was over 50%.

Other epoxy resin: EPICLON 830S (available from DAINIPPON INK AND CHEMICALS, INC.), bisphenol F liquid epoxy resin (liquid, number-average molecular weight: 350)

(2) Acrylate Monomer and/or Methacrylate Monomer, or Oligomer Thereof:
BISCOAT 300 (available from OSAKA ORGANIC CHEMICAL INDUSTRY LTD.), pentaerythritol triacrylate (molecular weight: 298, sp value: 11.1) BISCOAT 400 (available from OSAKA ORGANIC CHEMICAL INDUSTRY LTD.), pentaerythritol tetraacrylate (molecular weight: 352, sp value: 12.1)

(3) Thermoplastic Polymer:
Synthesis Example 1 (softening temperature: 80° C., particle diameter: 0.18 μm)
Synthesis Example 2 (softening temperature: 40° C., particle diameter: 0.25 μm)

(4) Light-Activated Radical Polymerization Initiator:
IRGACURE 184, 1-hydroxy-cyclohexyl-phenyl-ketone (5) Latent epoxy curing agent:
AMICURE VDH-J (available from AJINOMOTO FINE TECHNO CO,. INC.), 1,3-bis(hydranoethylcarboethyl)-5-isopropylhydantoin (melting point: 120° C.)
CUREZOL 2E4MZ-A (available from Shikoku Corporation), 2,4-diamino-6-[2'-ethyl-4'-methylimidazolyl-(1')]-ethyl-s-triadine (melting point: 215-225° C.)

(6) Partially Esterified Resin:
Synthesis Examples 3: Bisphenol F-type epoxy resin partially esterified with 2-methacryloyloxyethyl succinate
Synthesis Examples 4: Bisphenol F-type epoxy resin partially esterified with methacrylic acid

TABLE 1

| Composition | | P1 | P2 | P3 | P4 | C1 | C2 | C3 |
|---|---|---|---|---|---|---|---|---|
| | | \multicolumn{4}{c}{Example} | \multicolumn{3}{c}{Comparative Example} | | |
| (1) Epoxy resin | Solid epoxy resin EOCN-1020-75 | 15 | 15 | 20 | 15 | — | 15 | 15 |
| | Other epoxy resin EPICLON 830S | — | — | — | — | 15 | — | — |
| (2) Acrylate monomer and/or methacrylate monomer, or oligomer thereof | BISCOAT 300 | 20 | — | 20 | 20 | 20 | 20 | 20 |
| | BISCOAT 400 | — | 20 | — | — | — | — | — |
| (3) Thermoplastic polymer | Synthesis Example 1 | 15 | 15 | 15 | 15 | 15 | — | — |
| | Synthesis Example 2 | — | — | — | — | — | — | 15 |
| (4) Light-activated radical polymerization initiator | IRGACURE 184 | 2 | 2 | 2 | 2 | 2 | 2 | 2 |
| (5) Latent epoxy curing agent | AMICURE VDH-J | 6 | 6 | 6 | 6 | 6 | 6 | 6 |
| | CUREZOL 2E4MZ-A | 1 | 1 | 1 | 1 | 1 | 1 | 1 |
| (6) Partially esterified epoxy resin | Synthesis Example 3 | 20 | 20 | 10 | — | 20 | 20 | 20 |
| | Synthesis Example 4 | — | — | — | 20 | — | — | — |
| (7) Filler | SO-E1 | 20 | 20 | 25 | 20 | 20 | 35 | 20 |
| Additive | KBM403 | 1 | 1 | 1 | 1 | 1 | 1 | 1 |
| Ratio of constituent (1) relative to 100 parts by weight of constituent (2) | | 75 | 75 | 75 | 75 | 0 | 75 | 75 |

(1) Epoxy Resin:
Solid epoxy resin: EOCN-1020-75 (available from NIPPON KAYAKU CO., LTD., o-cresol novolak-type solid epoxy resin, softening temperature: 75° C., number-average molecular weight: 1100)

(7) Filler:
SO-E1 (available from ADMATECHS CO., LTD.), ultrapure silica

Additive:
KBM403 (available from Shin-Etsu Chemical Co., Ltd.), γ-glycidoxypropyl trimethoxysilane

TABLE 2

Test results of liquid crystal sealing agent composition

| Test item | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Liquid crystal sealing agent composition | P1 | P2 | P3 | P4 | C1 | C2 | C3 |
| Viscosity stability | A | A | A | A | A | A | C |
| Glass transition temperature of light cured product (° C.) | 86 | 88 | 86 | 83 | 55 | 59 | — |
| Gel fraction of heat cured product (%) | 82 | 81 | 78 | 81 | 78 | 55 | — |
| Cell gap size stability test | A | A | A | A | B | B | — |
| Bonding strength after light curing (MPa) | 5.1 | 3.1 | 4.0 | 4.2 | 4.8 | 0.1 | — |
| Bonding strength after light and heat curing (MPa) | 20.2 | 17.5 | 19.0 | 17.8 | 16.0 | 1.2 | — |
| Display characteristics test of liquid crystal display panel | A | A | A | A | B | C | — |
| Display characteristics test of shaded area of liquid crystal display panel | A | A | A | A | B | C | — |

As is clear from the results given in Table 2, the liquid crystal sealing agent compositions according to the present invention had good viscosity stability. Light cured products of the compositions had high glass transition temperatures, and heat cured products possessed high gel fractions. Accordingly, excellent results were obtained in cell gap size stability after light curing, bonding properties after light curing, bonding properties of light and heat curing, and display characteristics of the liquid crystal display panel and shaded area.

On the other hand, Comparative Example 1 resulted in low Tg of the light cured product because of the use of the liquid epoxy resin outside the scope of the invention. This result led to inferior cell gap size stability after light curing and display characteristics of the liquid crystal display panel. Comparative Example 2, which did not use the thermoplastic polymer, resulted in low Tg of the light cured product and low gel fraction of the heat cured product. This result led to inferior bonding strength after light curing, bonding strength after light and heat curing, cell gap size stability after light curing, and display characteristics of the liquid crystal display panel.

What is claimed is:

1. A liquid crystal sealing agent composition that is a one-component resin composition and is light-curable and heat-curable at a curing temperature, comprising:
   (1) a solid epoxy resin having a softening temperature by the ring and ball method of 40° C. or above;
   (2) an acrylate monomer and/or a methacrylate monomer, or an oligomer thereof;
   (3) a thermoplastic polymer having a softening temperature by the ring and ball method of 50 to 120° C. and lower than the curing temperature, the thermoplastic polymer being obtained by copolymerizing an acrylate monomer and/or a methacrylate monomer with a monomer copolymerizable therewith;
   (4) a light-activated radical polymerization initiator; and
   (5) a latent epoxy curing agent.

2. The liquid crystal sealing agent composition according to claim 1, further containing (6) a partially esterified epoxy resin obtained by reacting an epoxy resin with a compound having at least one methacryloyl or acryloyl group and at least one carboxyl group in the molecule.

3. The liquid crystal sealing agent composition according to claim 2, wherein the solid epoxy resin (1) ranges in number-average molecular weight from 500 to 2000.

4. The liquid crystal sealing agent composition according to claim 2, wherein the solid epoxy resin (1) is contained in an amount of 5 to 40 parts by weight in 100 parts by weight of the liquid crystal sealing agent composition.

5. The liquid crystal sealing agent composition according to claim 2, wherein the acrylate monomer and/or the methacrylate monomer, or the oligomer thereof (2) ranges in number-average molecular weight from 250 to 2000 and has a Fedors theoretical solubility parameter(sp value) in the range of 10.0 to 13.0 $(cal/cm^3)^{1/2}$.

6. The liquid crystal sealing agent composition according to claim 2, wherein the solid epoxy resin (1) is contained in an amount of 20 to less than 200 parts by weight per 100 parts by weight of the acrylate monomer and/or the methacrylate monomer, or the oligomer thereof (2).

7. The liquid crystal sealing agent composition according to claim 2, wherein the thermoplastic polymer (3) has an average particle diameter in the range of 0.05 to 5 μm.

8. The liquid crystal sealing agent composition according to claim 2, wherein the thermoplastic polymer (3) comprises substantially spherical particles having a core-shell structure, and a core layer of the core-shell structure comprises an elastomer obtained by copolymerizing an acrylate monomer and/or a methacrylate monomer with a monomer copolymerizable therewith.

9. The liquid crystal sealing agent composition according to claim 2, wherein the thermoplastic polymer (3) is contained in an amount of 2 to 40 parts by weight in 100 parts by weight of the liquid crystal sealing agent composition.

10. The liquid crystal sealing agent composition according to claim 2, wherein the latent epoxy curing agent (5) is an amine-based latent curing agent and has a melting point or a ring and ball method softening temperature of 100° C. or above.

11. The liquid crystal sealing agent composition according to claim 2, wherein the solid epoxy resin (1) and the acrylate monomer and/or the methacrylate monomer, or the oligomer thereof (2) are contained in a total amount of 160 to 800 parts by weight per 100 parts by weight of the partially esterified epoxy resin (6).

12. The liquid crystal sealing agent composition according to claim 2, having:
   (a) a glass transition temperature (Tg) in the range of 70 to 120° C. as measured after cured by 1000-3000 mJ light irradiation (determined with respect to a 100 μm thick cured product based on its dynamic viscoelasticity obtained by a tensile mode with a heating rate of 5° C./min and a frequency of 10 Hz); and
   (b) a gel fraction of 75% by weight or above as measured after heat cured at 110 to 140° C. for 1 hour (determined with respect to 1 g of a 100 μm thick cured product by 3-hour Soxhlet extraction using methanol).

13. A method of manufacturing a liquid crystal display panel, which method comprises performing one drop fill in which the liquid crystal sealing agent composition of claim 2 is light cured and is thereafter heat cured.

14. A liquid crystal display panel obtained by the method of claim 13.

15. The liquid crystal sealing agent composition according to claim 1, wherein the solid epoxy resin (1) ranges in number-average molecular weight from 500 to 2000.

16. The liquid crystal sealing agent composition according to claim 1, wherein the solid epoxy resin (1) is contained in an amount of 5 to 40 parts by weight in 100 parts by weight of the liquid crystal sealing agent composition.

17. The liquid crystal sealing agent composition according to claim 1, wherein the acrylate monomer and/or the methacrylate monomer, or the oligomer thereof (2) ranges in number-average molecular weight from 250 to 2000 and has a Fedors theoretical solubility parameter (sp value) in the range of 10.0 to 13.0 $(cal/cm^3)^{1/2}$.

18. The liquid crystal sealing agent composition according to claim 1, wherein the solid epoxy resin (1) is contained in an amount of 20 to less than 200 parts by weight per 100 parts by weight of the acrylate monomer and/or the methacrylate monomer, or the oligomer thereof (2).

19. The liquid crystal sealing agent composition according to claim 1, wherein the thermoplastic polymer (3) has an average particle diameter in the range of 0.05 to 5 μm.

20. The liquid crystal sealing agent composition according to claim 1, wherein the thermoplastic polymer (3) comprises substantially spherical particles having a core-shell structure, and a core layer of the core-shell structure comprises an elastomer obtained by copolymerizing an acrylate monomer and/or a methacrylate monomer with a monomer copolymerizable therewith.

21. The liquid crystal sealing agent composition according to claim 1, wherein the thermoplastic polymer (3) is contained in an amount of 2 to 40 parts by weight in 100 parts by weight of the liquid crystal sealing agent composition.

22. The liquid crystal sealing agent composition according to claim 1, wherein the latent epoxy curing agent (5) is an amine-based latent curing agent and has a melting point or a ring and ball method softening temperature of 100° C. or above.

23. The liquid crystal sealing agent composition according to claim 1, having:
   (a) a glass transition temperature (Tg) in the range of 70 to 120° C. as measured after cured by 1000-3000 mJ light irradiation (determined with respect to a 100 μm thick cured product based on its dynamic viscoelasticity obtained by a tensile mode with a heating rate of 5° C./min and a frequency of 10 Hz); and
   (b) a gel fraction of 75% by weight or above as measured after heat cured at 110 to 140° C. for 1 hour (determined with respect to 1 g of a 100 μm thick cured product by 3-hour Soxhlet extraction using methanol).

24. A method of manufacturing a liquid crystal display panel, which method comprises performing one drop fill in which the liquid crystal sealing agent composition of claim 1 is light cured and is thereafter heat cured.

25. A liquid crystal display panel obtained by the method of claim 24.

26. The liquid crystal sealing agent composition according to claim 1, wherein the thermoplastic polymer has a softening temperature by the ring and ball method of 50 to 105° C.

* * * * *